US007516451B2

(12) United States Patent
Peng

(10) Patent No.: US 7,516,451 B2
(45) Date of Patent: Apr. 7, 2009

(54) MAINTAINING MOBILE DEVICE ELECTRONIC FILES INCLUDING USING DIFFERENCE FILES WHEN UPGRADING

(75) Inventor: Luosheng Peng, Alviso, CA (US)

(73) Assignee: InnoPath Software, Inc., Sunnyvale, CA (US)

( * ) Notice: Subject to any disclaimer, the term of this patent is extended or adjusted under 35 U.S.C. 154(b) by 470 days.

(21) Appl. No.: 10/931,614

(22) Filed: Aug. 31, 2004

(65) Prior Publication Data

US 2006/0069755 A1 Mar. 30, 2006

(51) Int. Cl.
*G06F 9/44* (2006.01)
*G06F 15/177* (2006.01)

(52) U.S. Cl. .................. 717/173; 717/168; 709/220; 455/418; 455/419; 455/420

(58) Field of Classification Search .................. 709/220; 717/168–178; 455/418–220
See application file for complete search history.

(56) References Cited

U.S. PATENT DOCUMENTS

| 4,875,159 | A | | 10/1989 | Cary |
| 5,444,764 | A | | 8/1995 | Galecki |
| 5,479,654 | A | | 12/1995 | Squibb |
| 5,574,906 | A | | 11/1996 | Morris |
| 5,634,052 | A | | 5/1997 | Morris |
| 5,701,502 | A | * | 12/1997 | Baker et al. ............... 709/201 |
| 5,729,735 | A | | 3/1998 | Meyering |
| 5,742,905 | A | | 4/1998 | Pepe |
| 5,758,062 | A | | 5/1998 | McMahon |
| 5,805,891 | A | * | 9/1998 | Bizuneh et al. ............ 717/121 |
| 5,805,899 | A | | 9/1998 | Evans |
| 5,806,078 | A | | 9/1998 | Hug |
| 5,813,017 | A | | 9/1998 | Morris |
| 5,832,520 | A | | 11/1998 | Miller |

(Continued)

FOREIGN PATENT DOCUMENTS

GB    2349485 A    11/2000

(Continued)

OTHER PUBLICATIONS

Mobile Agent based Network Access for Mobile Electronic Guidebooks, Haneef et al., 2002, IEEE, pp. 1-4.*

(Continued)

*Primary Examiner*—Wei Y Zhen
*Assistant Examiner*—Satish Rampuria
(74) *Attorney, Agent, or Firm*—Courtney Staniford & Gregory LLP

(57) ABSTRACT

A mobile device is provided that includes a first processor coupled among at least one additional processor and a communication device for use in maintaining electronic files of the device. The mobile device can, for example, be a cellular telephone. The mobile device further includes an upgrade engine coupled to the first processor. The upgrade engine receives maintenance files from remote servers via the communication device, where the maintenance files include difference files. The upgrade engine uses information of the difference files to update software of the first processor. In addition to the upgrade engine, the mobile device includes an emulator that is coupled to the upgrade engine. The emulator transfers pre-specified ones of the difference files to the additional processor(s) where a rewrite engine uses the difference files to upgrade software of the additional processor(s).

25 Claims, 5 Drawing Sheets

U.S. PATENT DOCUMENTS

| | | | |
|---|---|---|---|
| 5,850,565 | A | 12/1998 | Wightman |
| 5,864,757 | A | 1/1999 | Parker |
| 5,893,119 | A | 4/1999 | Squibb |
| 6,018,747 | A | 1/2000 | Burns |
| 6,023,620 | A * | 2/2000 | Hansson ............... 455/419 |
| 6,029,000 | A | 2/2000 | Woolsey |
| 6,041,333 | A | 3/2000 | Bretschneider |
| 6,052,531 | A | 4/2000 | Waldin |
| 6,076,148 | A | 6/2000 | Kedem |
| 6,078,967 | A | 6/2000 | Fulghum |
| 6,088,694 | A | 7/2000 | Burns |
| 6,128,629 | A | 10/2000 | Bretschneider |
| 6,145,012 | A | 11/2000 | Small |
| 6,163,811 | A | 12/2000 | Porter |
| 6,167,258 | A | 12/2000 | Schmidt |
| 6,216,175 | B1 | 4/2001 | Sliger |
| 6,226,784 | B1 | 5/2001 | Holmes |
| 6,233,589 | B1 | 5/2001 | Balcha |
| 6,249,818 | B1 | 6/2001 | Sharma |
| 6,269,456 | B1 | 7/2001 | Hodges |
| 6,327,671 | B1 | 12/2001 | Menon |
| 6,349,311 | B1 | 2/2002 | Sobel |
| 6,374,250 | B2 | 4/2002 | Ajtai |
| 6,401,239 | B1 | 6/2002 | Miron |
| 6,411,227 | B1 | 6/2002 | Fish |
| 6,442,660 | B1 | 8/2002 | Henerlau |
| 6,457,175 | B1 | 9/2002 | Lerche |
| 6,466,999 | B1 | 10/2002 | Sliger |
| 6,470,329 | B1 | 10/2002 | Livschitz |
| 6,526,574 | B1 | 2/2003 | Jones |
| 6,535,894 | B1 | 3/2003 | Schmidt |
| 6,542,906 | B2 | 4/2003 | Korn |
| 6,594,822 | B1 | 7/2003 | Schweitz |
| 6,615,404 | B1 | 9/2003 | Garfunkel |
| 6,629,110 | B2 | 9/2003 | Cane |
| 6,651,061 | B2 | 11/2003 | Unchida |
| 6,651,190 | B1 | 11/2003 | Worley |
| 6,662,163 | B1 | 12/2003 | Albayrak |
| 6,671,703 | B2 | 12/2003 | Thompson |
| 6,671,757 | B1 | 12/2003 | Multer |
| 6,694,336 | B1 | 2/2004 | Multer |
| 6,701,315 | B1 | 3/2004 | Austin |
| 6,754,816 | B1 | 6/2004 | Layton |
| 6,785,786 | B1 | 8/2004 | Gold |
| 6,832,373 | B2 * | 12/2004 | O'Neill ............... 717/171 |
| 6,836,657 | B2 | 12/2004 | Ji |
| 6,854,010 | B1 * | 2/2005 | Christian et al. ............ 709/223 |
| 6,871,344 | B2 | 3/2005 | Grier |
| 6,892,381 | B2 | 5/2005 | Kim |
| 6,898,564 | B1 | 5/2005 | Odhner |
| 6,912,591 | B2 | 6/2005 | Lash |
| 6,925,467 | B2 | 8/2005 | Gu |
| 6,954,765 | B2 | 10/2005 | Spiegel |
| 6,965,928 | B1 * | 11/2005 | Cox et al. ............... 709/220 |
| 7,016,695 | B1 * | 3/2006 | Bahai ............... 455/466 |
| 7,203,723 | B2 * | 4/2007 | Ogawa ............... 709/203 |
| 2001/0029178 | A1 | 10/2001 | Criss |
| 2001/0049263 | A1 | 12/2001 | Zhang |
| 2002/0099726 | A1 | 7/2002 | Crudele |
| 2002/0120697 | A1 | 8/2002 | Generous |
| 2002/0129107 | A1 | 9/2002 | Loughran |
| 2003/0074487 | A1 | 4/2003 | Akgul et al. |
| 2003/0110253 | A1 | 6/2003 | Anuszczyk |
| 2003/0200207 | A1 | 10/2003 | Dickinson |
| 2003/0212712 | A1 | 11/2003 | Gu |
| 2003/0217192 | A1 * | 11/2003 | White et al. ............... 709/321 |
| 2003/0220944 | A1 | 11/2003 | Schottland |
| 2003/0224768 | A1 * | 12/2003 | Adjamah ............... 455/418 |
| 2004/0031027 | A1 | 2/2004 | Hiltgen |
| 2004/0062130 | A1 | 4/2004 | Chiang |
| 2004/0073582 | A1 | 4/2004 | Spiegel |
| 2004/0092255 | A1 | 5/2004 | Ji |
| 2004/0098361 | A1 | 5/2004 | Peng |
| 2004/0098413 | A1 | 5/2004 | Peng |
| 2004/0098420 | A1 | 5/2004 | Peng |
| 2004/0098421 | A1 | 5/2004 | Peng |
| 2004/0098427 | A1 | 5/2004 | Peng |
| 2004/0111427 | A1 | 6/2004 | Gu |
| 2004/0111484 | A1 | 6/2004 | Young |
| 2004/0152455 | A1 * | 8/2004 | Herle ............... 455/418 |
| 2004/0193643 | A1 | 9/2004 | O'Brien |
| 2004/0220980 | A1 | 11/2004 | Forster |
| 2004/0225996 | A1 | 11/2004 | Venkatesan |
| 2004/0260923 | A1 | 12/2004 | Nakai |
| 2004/0261072 | A1 * | 12/2004 | Herle ............... 717/171 |
| 2005/0010576 | A1 | 1/2005 | Ren |
| 2005/0010870 | A1 | 1/2005 | Gu |
| 2005/0060163 | A1 | 3/2005 | Barsness |
| 2005/0064859 | A1 * | 3/2005 | Kotzin et al. ............... 455/419 |
| 2005/0091288 | A1 | 4/2005 | Ji |
| 2005/0102318 | A1 | 5/2005 | Odhner |
| 2005/0172280 | A1 * | 8/2005 | Ziegler et al. ............... 717/168 |
| 2005/0234997 | A1 | 10/2005 | Gu |
| 2006/0046703 | A1 * | 3/2006 | Liu et al. ............... 455/418 |
| 2006/0063519 | A1 * | 3/2006 | Rajaram ............... 455/419 |

FOREIGN PATENT DOCUMENTS

WO           9932969 A1     7/1999

OTHER PUBLICATIONS

Software for the Next-Generation Automobile, Simonds, 2003 IEEE, pp. 7-11.*
Radio Software Download for Commercial Wireless Reconfigurable Devices, Hoffmeyer et al., 2004 IEEE, pp. S26-S32.*
Radio software download for commercial wireless reconfigurable devices, Hoffmeyer, J.; II-Pyung Park; Majmundar, M.; Blust, S., IEEE, vol. 42, Issue: 3, 2004, pp. S26-S32.*
Agents and mobile handsets, Mahan, M., IEEE, 2001, pp. 448-451.*
Development of flexible peer-to-peer information systems using adaptable mobile agents, Arcangeli, J.-P.; Leriche, S.; Pantel, M., IEEE, 2004, pp. 1-5.*
Tichy, Walter F., "The string-to-string correction problem with block moves", ACM Transaction on Computer Systems, vol. 2, No. 4, Nov. 1984, pp. 309-321.
Ajtai, Miklos et al., "Compactly encoding unstructured inputs with differential compression", IBM Almaden Research Center, 44 pages.
Burns, Randal C. et al., "In-place reconstruction of delta compressed files", IBM Almaden Research Center, 9 pages.
Burns, Randal et al., "In-place reconstruction of version differences", IBM Almaden Research Center, 25 pages.
Liv, Jacob et al., "A universal algorithm for sequential data compression", IEEE Transactions on Information Theory, vol. IT-23, No. 3, May 1977.
Hauptmann, Steffen et al., "On-line maintenance with on-the-fly software replacement", Configurable Distributed Systems, Proceedings, Third IEEE International Conference, May 6, 1996, pp. 80-80.
Chakravorty et al., "Architecture and implementation of a remote management framework for dynamically reconfigurable devices", Networks, 2002. ICON 2002. 10th IEEE International Conference, Aug. 27, 2002, pp. 375-380.
Lyu et al., "A procedure0based dynamic software update", Dependable Systems and Networks, 2001. Proceedings, The International Conference, Jul. 1, 2001. pp. 271-280.
Bialek, R. P., "The architecture of a dynamically updatable, component-based system", Computer Software and Application Conference, 2002. COMPSAC 2002. Proceedings, 26th Annual International, Aug. 26, 2002, pp. 1012-1016.
Gumbold, M., "Software distribution by reliable multicast", Local Computer Networks, 1996. Proceedings, 21st IEEE Conference, Oct. 13, 1996, pp. 222-231.

* cited by examiner

MAINTAINING MOBILE DEVICE ELECTRONIC FILES INCLUDING USING DIFFERENCE FILES WHEN UPGRADING

RELATED APPLICATIONS

This application relates to the following U.S. patent application Ser. Nos. 10/146,545, filed May 13, 2002; 10/261,153, filed Sep. 30, 2002; 10/292,245, filed Nov. 12, 2002; 10/298,458, 10/298,393, 10/298,863, 10/298,862, and 10/298,896, all filed Nov. 18, 2002; 10/600,978, filed Jun. 20, 2003; and 10/616,615 and 10/616,681, both filed Jul. 9, 2003.

TECHNICAL FIELD

The disclosed embodiments relate to maintaining electronic files of mobile processing devices.

BACKGROUND

Portable processor-based devices have become very popular in societies around the world. As the popularity of portable electronic devices has increased, so too has consumer dependence on these devices. Consumers now rely on portable electronic devices like cellular telephones, portable computers, and personal digital assistants (PDAs), for example, for everything from voice communication to remote Internet access. Increasingly, consumers demand varied voice and data capabilities in one relatively small device. Manufacturers have responded by producing handheld devices that include increased processing power and rich software applications.

While numerous rich software applications are desirable to consumers, the software applications pose problems for device manufacturers because the software running on a processor, microprocessor, and/or processing unit often changes over time. The changes can result from the need to correct bugs, or errors, in the software files, adapt to evolving technologies, or add new features, to name a few. In particular, embedded software components hosted on mobile processing devices, for example mobile wireless devices, often include numerous software bugs that require correction. Software includes one or more files in the form of human-readable American Standard Code for Information Interchange (ASCII) plain text files or binary code, and software files can be divided into smaller units that are also referred to as modules or components. Consequently, the device/software manufacturer must provide for maintenance/support of the software as the software changes over time.

Obstacles to maintaining and supporting the software of mobile processing devices are many, including the time, bandwidth, and device resources associated with maintaining the software. In considering device resources, delivery of maintenance files to the device and performance of software maintenance in the device must be performed with efficient use of available device resources, including processor cycles and memory, without the demand for an increase in device resources.

Even though semiconductor manufacturing technology has progressed to produce greater capability in ever smaller integrated circuit packages, there is always a demand for more processing power and memory, especially on small devices. For example, if on-board processors and memory are not used efficiently, it may be necessary to provide more physical processors and memory, which increases both size and cost of the device. It is therefore desirable for the device hardware and software to efficiently allocate and use scarce resources, such as processor time and memory.

Figure 1:
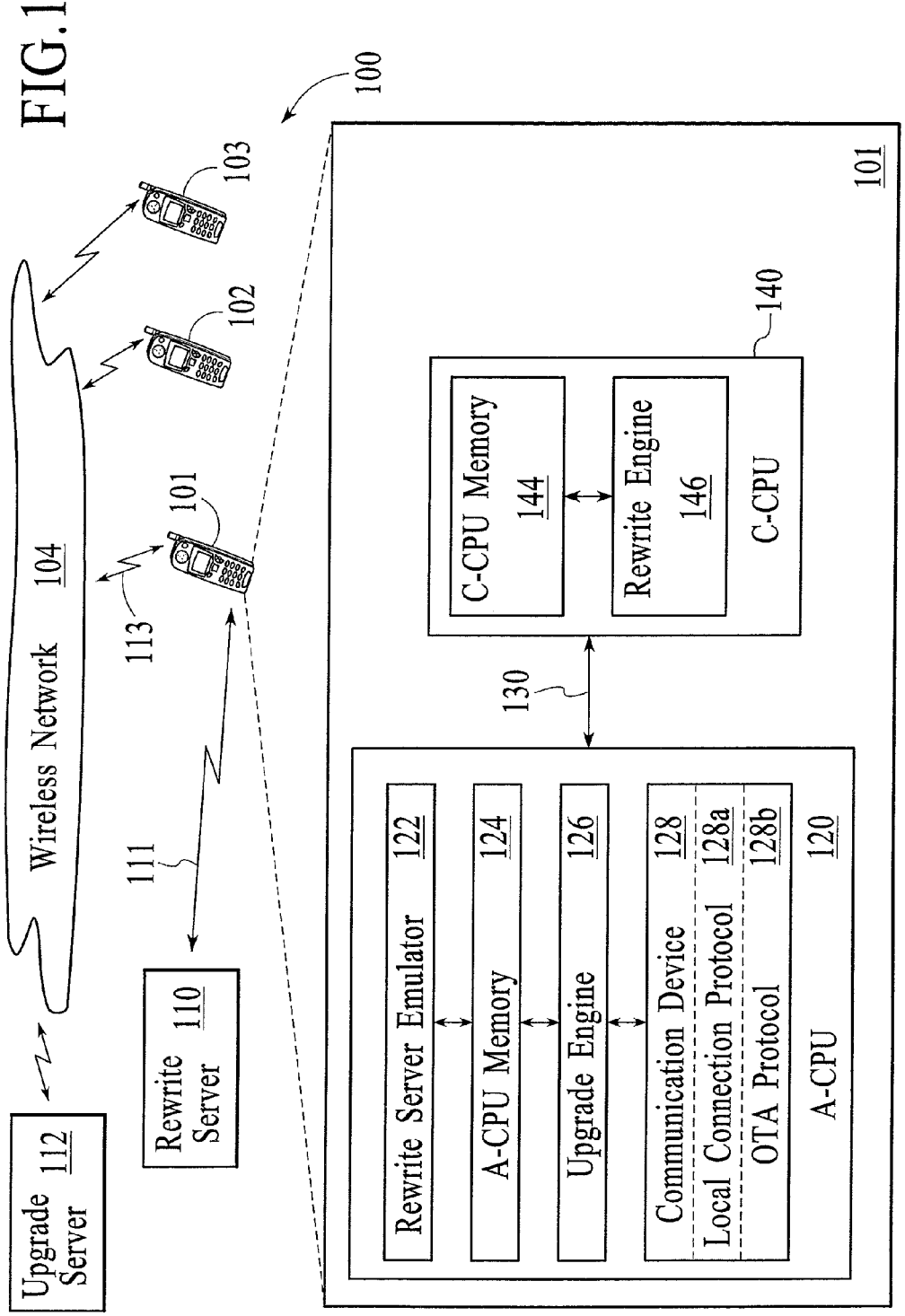
FIG. 1 is a block diagram of a system for maintaining electronic files in mobile devices, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 120 is first introduced and discussed with respect to FIG. 1).

DETAILED DESCRIPTION

Systems and methods for maintaining electronic files, also referred to as software, in mobile processing devices are described in detail herein. The system of an embodiment includes a mobile device that includes a first processor coupled among one or more additional processors and a communication device. The mobile device can, for example, be a cellular telephone. The mobile device further includes an upgrade engine running on and/or coupled to the first processor. The upgrade engine receives maintenance files from remote servers via the communication device, where the maintenance files include difference files. The upgrade engine uses information of the difference files to update software of the first processor. In addition to the upgrade engine, the mobile device includes an emulator that is running on and/or coupled to the upgrade engine. The emulator transfers pre-specified ones of the difference files to the additional processor(s) where a rewrite engine uses the difference files to upgrade software of the additional processor(s).

In the following description, numerous specific details are introduced to provide a thorough understanding of, and enabling description for, embodiments of the system for maintaining electronic files. One skilled in the relevant art, however, will recognize that the system for maintaining electronic files can be practiced without one or more of the specific details, or with other components, systems, etc. In other instances, well-known structures or operations are not shown, or are not described in detail, to avoid obscuring aspects of the system for maintaining electronic files.

FIG. 1 is a block diagram of a system 100 for maintaining electronic files in mobile devices 101-103, under an embodiment. The system 100 includes mobile devices 101-103 coupled for communication with a wireless network 104. The mobile devices 101-103 include, for example, cellular telephones, personal computers, portable computing devices, portable telephones, portable communication devices, subscriber devices or units, and personal digital assistants. The mobile devices 101-103, also referred to as "mobile communication devices," "portable communication devices" and "communication devices," can include all such devices and equivalents, and are not limited to communication devices that are wireless. The wireless network 104 includes various network components (not shown) of a communication service provider or carrier; but is not so limited. Further, the network 104 and corresponding network components can be any of a number of network types known in the art including, but not limited to, local area networks (LANs), metropolitan area networks (MANs), wide area networks (WANs), proprietary networks, backend networks, and the Internet.

The mobile devices 101-103 are configured to communicate data and voice information via the network 104, but are not so limited. A mobile device 101 of an embodiment, therefore, includes two processors 120 and 140, also referred to herein as central processing units (CPUs). A first processor 120 of the mobile device 101 is an application CPU (A-CPU) 120 or application processor that, for example, supports device applications and functions including wireless computing, graphics, games, cameras, and Internet access.

The A-CPU 120 of an embodiment includes on-chip memory 124, referred to herein as A-CPU memory 124, but alternative embodiments can couple the A-CPU 120 to memory or memory devices that are separate off-chip components. The A-CPU memory 124 includes Read-Only Memory (ROM), Flash ROM, Random Access Memory (RAM), and other memory types known in the art. One skilled in the art recognizes that the A-CPU memory 124 can be any of a number of commercially available memory types assembled in any of a number of configurations.

The A-CPU 120 couples to a second processor 140 of the mobile device 101, referred to herein as a communication CPU (C-CPU) 140 or communication processor, via at least one internal bus 130. The C-CPU 140 supports communication signal processing appropriate to the communication protocols in use by the network 104. Communication protocols used by the network include, for example, Global System for Mobile communication (GSM), General Packet Radio Service (GPRS), Code Division Multiple Access (CDMA), and Time Division Multiple Access (TDMA), but are not so limited.

The C-CPU 140 of an embodiment includes on-chip memory 144, referred to herein as C-CPU memory 144, but alternative embodiments can couple the C-CPU 140 to memory or memory devices that are separate off-chip components. The C-CPU memory 144 includes ROM, Flash ROM, and RAM, for example, as well as other memory types known in the art. One skilled in the art recognizes that the C-CPU memory 144, like the A-CPU memory 124, can be any of a number of commercially available memory types assembled in any of a number of configurations. In addition to the A-CPU and C-CPU, components of the mobile devices 101 can also include any number of components (not shown) known in the art, for example, buses, controllers, memory devices, data input/output (I/O) devices, displays, user interfaces, Subscriber Identity Module (SIM)/User Identity Module (UIM) cards, transmitter and receiver circuits, and antennas, in any number of combinations.

Further, the mobile device 101 includes components for use in providing mobile device software maintenance, also referred to herein as software maintenance. The software maintenance described herein includes point-of-service and portal software rewrites (referred to as rewrite updates) as well as over-the-air (OTA) software maintenance and upgrades (referred to as OTA upgrades), but is not so limited. The components of the mobile device 101 used in software maintenance include an upgrade engine 126, a rewrite server emulator 122 (also referred to as an emulator 122), a communication device 128, and a rewrite engine 146. The emulator 122, upgrade engine 126, and communication device 128 each run under control of the A-CPU 120, while the rewrite engine 146 runs under control of the C-CPU 140, but the embodiment is not so limited.

The communication device 128 uses communication protocols including a local area connection protocol 128a and an OTA protocol 128b. The local area connection protocol 128a provides local area connections 111 with the rewrite server 110 in support of rewrite updates, as described above. The OTA protocol 128b provides wireless connections 113 with the upgrade server 112, via the wireless network 104, in support of OTA upgrades, as described above. The internal bus 130 supports communications between components of the A-CPU, including the emulator 122, and components of the C-CPU that include the rewrite engine 146. An operational description of the software maintenance components of the mobile device 101 follows below.

The rewrite updates of the software maintenance are device software rewrites that are used to repair bugs and/or update features of embedded software in the mobile device. In performing rewrite updates, generally, software developers or device manufacturers can register new ROM images and the corresponding mobile devices with a rewrite system. The rewrite system uses a differential engine to generate small delta files (also referred to as difference files or maintenance files) that are provided to remote servers which, with reference to FIG. 1, are referred to herein as rewrite servers 110. The rewrite servers 110 are configured to transfer the delta files to the mobile devices 101 through a local area connection 111. The local area connection 111 includes at least one of a hard-wired connection like a cable, a Bluetooth connection, a wireless local area network (WLAN) connection, a Wireless Fidelity (WiFi) connection, and an infrared (IrDA) connection. Embedded components of the mobile device 101 unpack and use the delta file to rewrite the corresponding software of the mobile device 101, as described below. The rewrite system is described further in the Related Applications referenced above.

The OTA upgrades of the software maintenance are continuous upgrades to the mobile device embedded software including upgrades associated with new features, services, and bug fixes. The embedded software includes the real-time operating system (RTOS), protocol stack, software libraries, drivers, Java™ virtual machine, microbrowsers, and embedded applications, but is not so limited. In performing OTA upgrades, generally, wireless service providers and mobile device manufacturers register new software components and their targeted devices with an upgrade system using web-based interfaces. Following registration, components of the upgrade system compare the old software file to the new software file and generate a delta file. The delta file is submitted to wireless carriers or other hosted service sites which provide the delta file to an upgrade server 112, with reference to FIG. 1. The upgrade server 112 is a component of the wireless network, but is not so limited.

Once received and approved for distribution, the wireless service provider schedules and broadcasts notifications to mobile device users as appropriate. Following receipt of notification, the users can proceed to initiate, schedule, or decline an upgrade. If an upgrade is initiated or scheduled, the upgrade servers 112 transfer the delta files to the mobile devices 101 via an OTA connection 113. The OTA connection 113 includes at least one of a coupling via the service provider wireless infrastructure, a communication network, a cellular telephone network, a radio frequency (RF) network, a metropolitan area network (MAN), a wide area network (WAN), and proprietary networks. Embedded components of the mobile device 101 unpack and use the delta files to upgrade the corresponding software of the mobile device 101, as described below. When an upgrade is initiated or scheduled, it is delivered to the mobile device without interrupting wireless service. The upgrade system is described further in the Related Applications referenced above.

Contents of the delta files provide an efficient representation of the differences between the new version and the original version of a software file. The delta file includes meta-data along with actual data of replacement and/or insertion operations that represent the differences between the new or current version of the associated file and previous versions of the file, as described in the Related Applications referenced above, but is not so limited.

Figure 2:
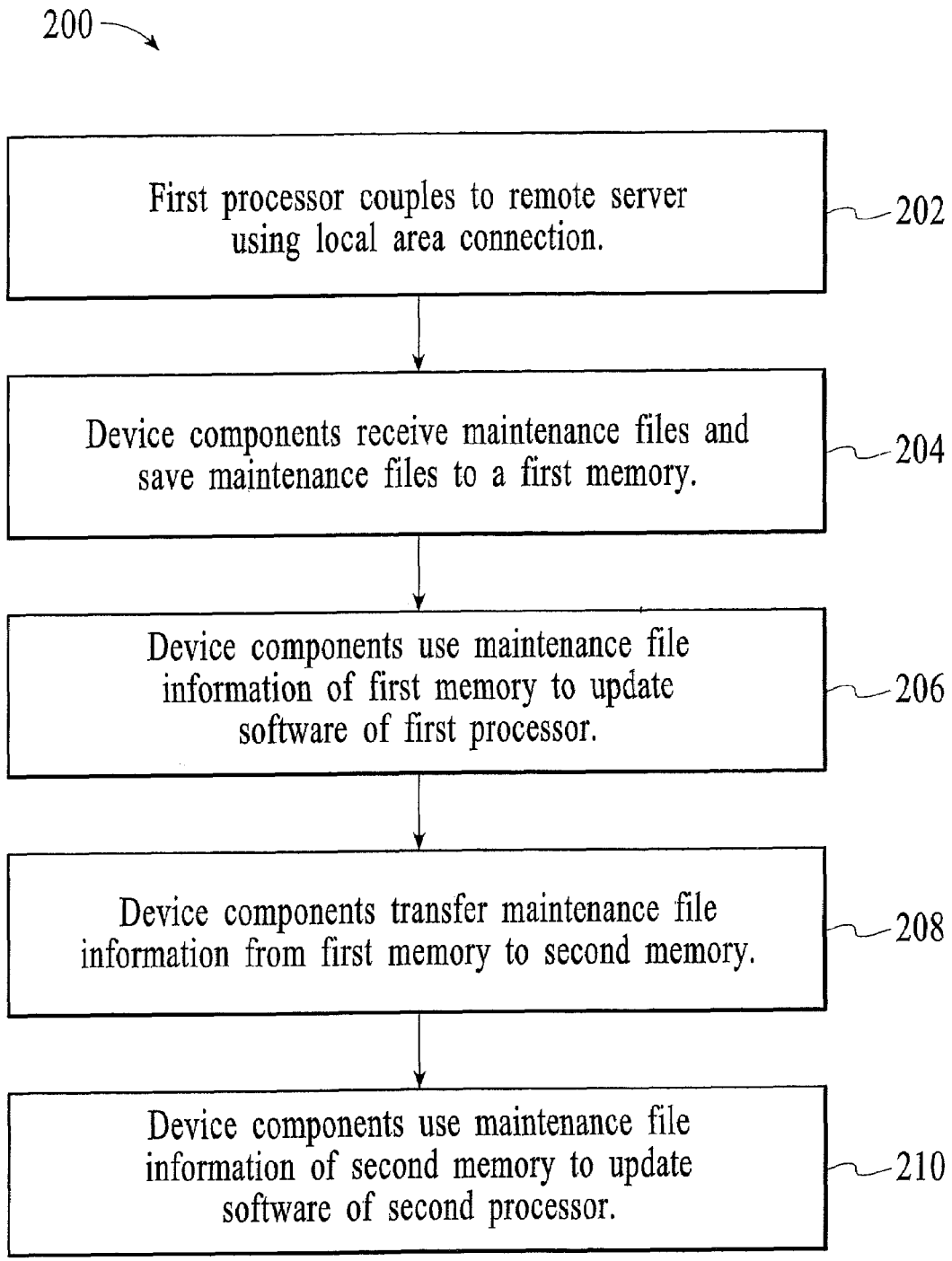
FIG. 2 is a flow diagram for maintaining electronic files of a mobile device, under the embodiment of FIG. 1

Generally, the mobile device of an embodiment includes a method for maintaining hosted electronic files. FIG. 2 is a flow diagram 200 for maintaining electronic files of a mobile device, under the embodiment of FIG. 1. The method comprises coupling a first processor of the mobile device to at least one remote server in order to receive update or maintenance information, at block 202. The coupling includes at least one of wired, wireless, and wired/wireless couplings. The remote server can be any of the rewrite server and/or the upgrade server described herein, as well as other types of servers known in the art. Components of the mobile device receive at least one maintenance file from the server via the coupling between the first processor and the server, at block 204. The maintenance files include, for example first and second delta or difference files, but can include other software files known in the art. Components of the mobile device store the maintenance files in a first memory area or device of the first processor; alternative embodiments can store the maintenance files in any memory area/device accessible by components of the mobile device.

Continuing, components of the mobile device update software files of the first processor using the first difference file, at block 206, where the update includes rewrites of the software files and upgrades of prespecified components of the software files. Components of the mobile device transfer the second difference file to a second memory of a second processor of the mobile device, at block 208. Components of the mobile device update software files of the second processor using the second difference file, at block 210, where the update includes rewrites of the software files and upgrades of pre-specified components of the software files.

Figure 3:
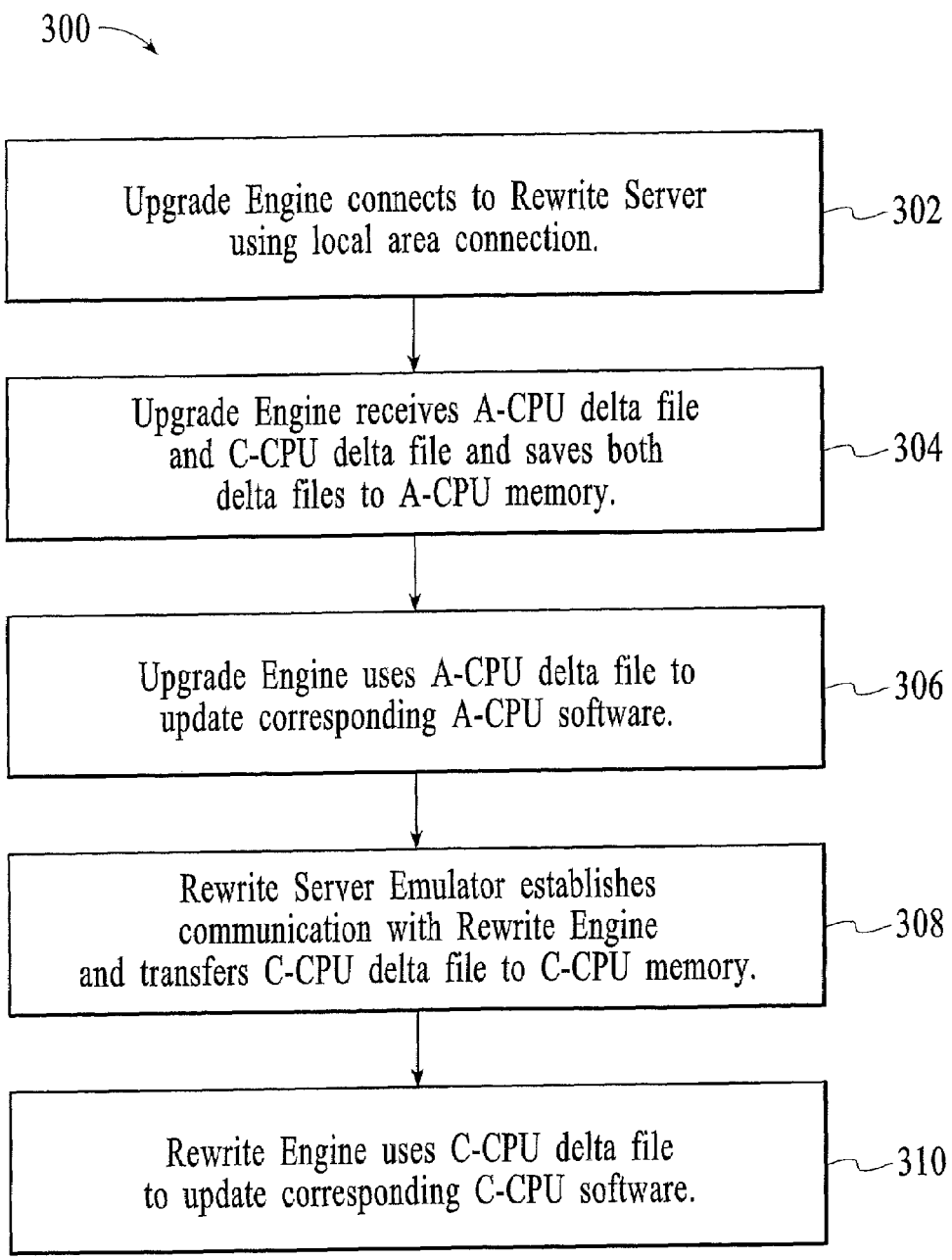
FIG. 3 is a flow diagram for rewriting pre-installed electronic files of a mobile device, under the embodiment of FIG. 1.

Returning to FIG. 1, the mobile device of an embodiment maintains hosted electronic files using components that include the upgrade engine 126, rewrite server emulator 122 (also referred to as an emulator 122), communication device 128, and rewrite engine 146. These components support both rewrite updates and OTA upgrades, for example. In supporting rewrite updates, FIG. 3 is a flow diagram 300 for rewriting electronic files of a mobile device using rewrite updates, under the embodiment of FIG. 1. In operation, the upgrade engine of the A-CPU uses the local area protocol of the communication device to establish communications with the rewrite server, at block 302. The communications between the upgrade engine and the rewrite server occur over a local area connection that is at least one of a hard-wired connection like a cable, a Bluetooth connection, a wireless local area network (WLAN) connection, a Wireless Fidelity (WiFi) connection, and an infrared (IrDA) connection, but is not so limited.

Upon establishing communications with the rewrite server, the upgrade engine receives or downloads maintenance files from the rewrite server, at block 304. The maintenance files include delta files for use in rewriting software of the mobile device. As an example, the maintenance files of an embodiment include a delta file for use in rewriting software of the A-CPU (referred to as the A-CPU rewrite delta file or A-CPU delta file) and a delta file for use in rewriting software of the C-CPU (referred to as the C-CPU rewrite delta file or C-CPU delta file), but alternative embodiments can include other file types in the maintenance files. The upgrade engine stores the A-CPU delta files and the C-CPU delta files in the A-CPU memory.

In preparing to rewrite the A-CPU software, the upgrade engine reads the A-CPU delta files from the A-CPU memory. The upgrade engine uses the A-CPU delta files to perform a rewrite of the A-CPU software to which the A-CPU delta files correspond, as described in the Related Applications referenced above, at block 306.

Regarding rewriting of the C-CPU software, the emulator reads the C-CPU delta files from the A-CPU memory. The emulator also establishes communications with the rewrite engine of the C-CPU via an internal communication bus of the mobile device. Upon establishing communications with the rewrite engine, the emulator transfers or downloads the C-CPU delta files to the rewrite engine, at block 308. The rewrite engine stores the C-CPU delta files in the C-CPU memory.

The rewrite engine reads the C-CPU delta files from the C-CPU memory as appropriate to the rewrite procedure. The rewrite engine then uses the C-CPU delta files to perform a rewrite of the C-CPU software to which the C-CPU delta files correspond, as described in Related Applications referenced above, at block 310.

Figure 4:
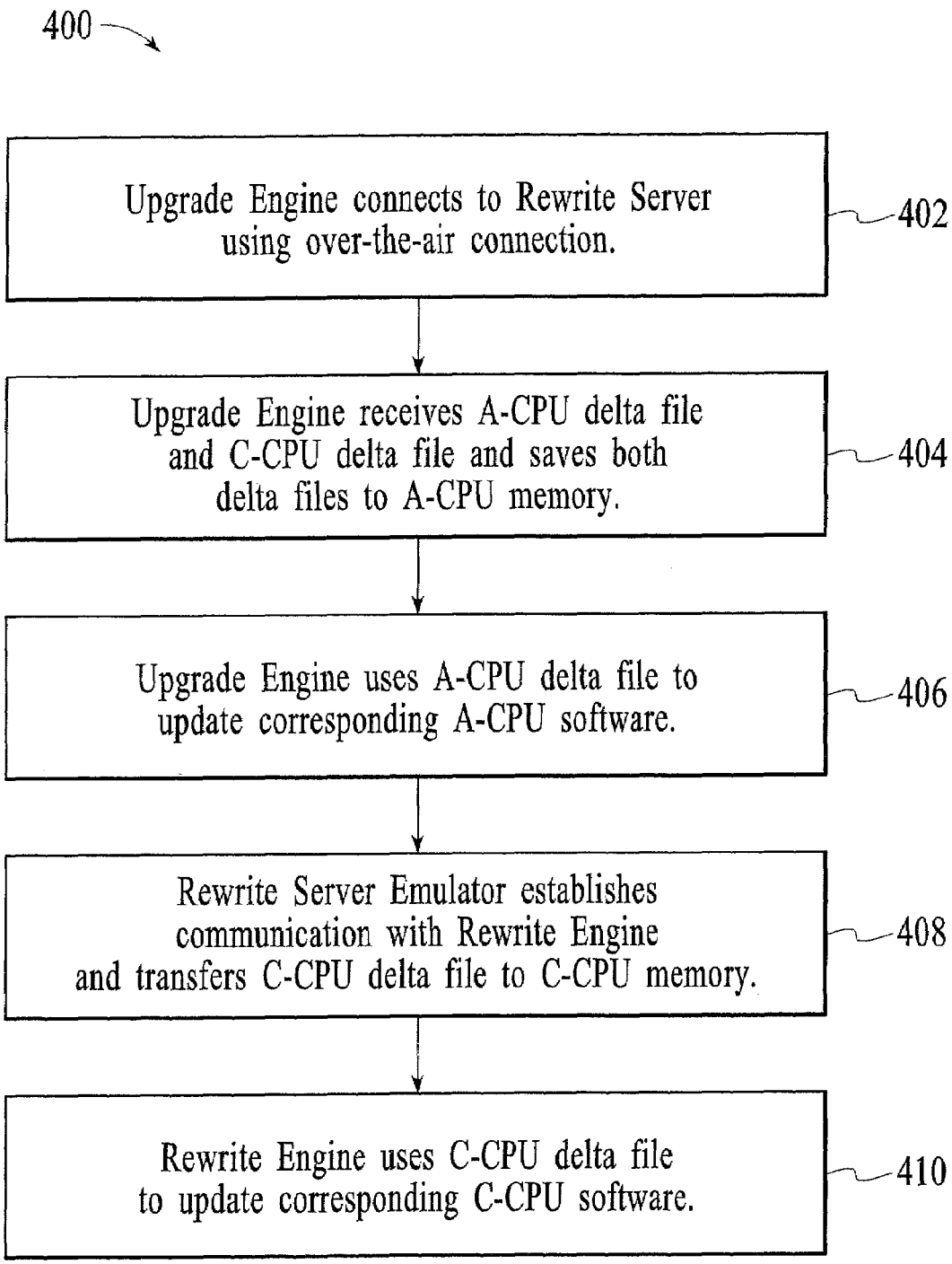
FIG. 4 is a flow diagram for upgrading electronic files of a mobile device, under the embodiment of FIG. 1.

The upgrade engine 126, rewrite server emulator 122 (also referred to as an emulator 122), communication device 128, and rewrite engine 146 of the mobile device also support OTA upgrades in mobile devices, as described above. In supporting OTA upgrades, FIG. 4 is a flow diagram 400 for upgrading electronic files of a mobile device using OTA upgrades, under the embodiment of FIG. 1. In operation, the upgrade engine of the A-CPU uses the OTA protocol of the communication device to establish communications with the upgrade server, at block 402. The communications between the upgrade engine and the upgrade server occur over a wireless connection via at least one of a communication network, a cellular telephone network, a radio frequency (RF) network, a metropolitan area network (MAN), a wide area network (WAN), and proprietary networks, but is not so limited.

Upon establishing communications with the upgrade server, the upgrade engine receives or downloads maintenance files from the upgrade server, at block 404. The maintenance files include delta files for use in upgrading software of the mobile device. As an example, the maintenance files of an embodiment include a delta file for use in upgrading software of the A-CPU (referred to as the A-CPU upgrade delta file or A-CPU delta file) and a delta file for use in upgrading software of the C-CPU (referred to as the C-CPU upgrade delta file or C-CPU delta file), but alternative embodiments can include other file types in the maintenance files. The upgrade engine stores the A-CPU delta files and the C-CPU delta files in the A-CPU memory.

In preparing to upgrade the A-CPU software, the upgrade engine reads the A-CPU delta files from the A-CPU memory. The upgrade engine uses the A-CPU delta files to perform an upgrade of the A-CPU software to which the A-CPU delta files correspond, as described in the Related Applications referenced above, at block 406.

Regarding upgrading of the C-CPU software, the emulator reads the C-CPU delta files from the A-CPU memory. The emulator also establishes communications with the rewrite engine of the C-CPU via an internal communication bus of the mobile device. Upon establishing communications with the rewrite engine, the emulator transfers or downloads the C-CPU delta files to the rewrite engine, at block 408. The rewrite engine stores the C-CPU delta files in the C-CPU memory.

The rewrite engine reads the C-CPU delta files from the C-CPU memory as appropriate to the upgrade procedure. The rewrite engine then uses the C-CPU delta files to perform an upgrade of the C-CPU software to which the C-CPU delta files correspond, as described in the Related Applications referenced above, at block 410.

Figure 5:
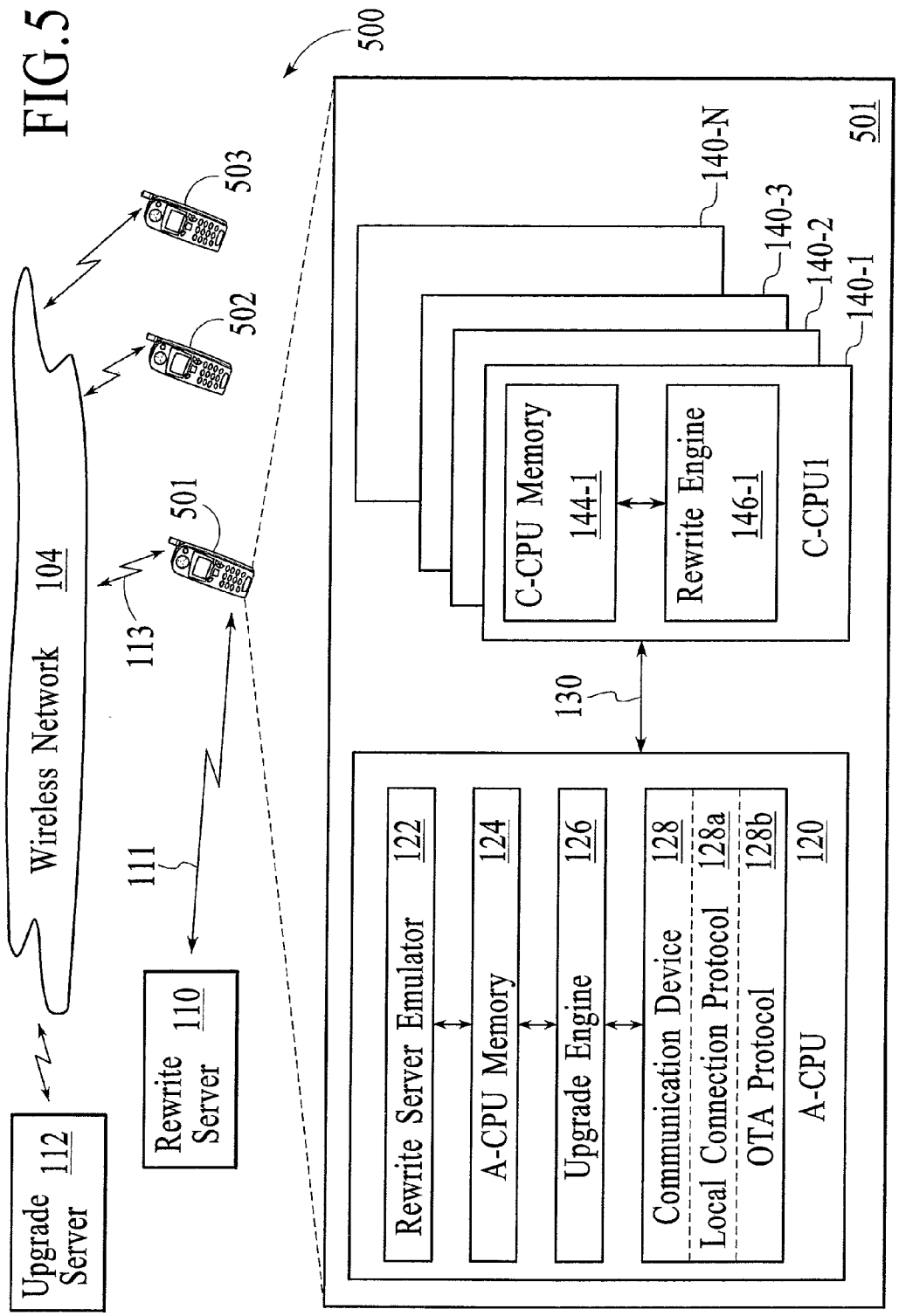
FIG. 5 is a block diagram of a system for maintaining electronic files in mobile devices, under an alternative embodiment.

FIG. 5 is a block diagram of a system 500 for maintaining electronic files in mobile devices 501-503, under an alternative embodiment. The system 500 includes mobile devices 501-503 coupled for communication with a wireless network 104. The mobile devices 501-503 include, for example, any number/combination of cellular telephones, personal computers, portable computing devices, portable telephones, portable communication devices, subscriber devices or units, and personal digital assistants.

The mobile devices 501-503 are configured to communicate data and voice information via the network 104, but are not so limited. A mobile device 501 of an embodiment, therefore, includes processors 120 and 140-X (where "X" is a number 1, 2, . . . N), also referred to herein as central processing units (CPUs). A first processor 120 of the mobile device 501 is an application CPU (A-CPU) 120 or application processor that, for example, supports device applications and functions including wireless computing, graphics, games, cameras, and Internet access. The first processor 120 functions as described above with reference to FIGS. 1-4.

The A-CPU 120 of an embodiment includes on-chip memory 124, referred to herein as A-CPU memory 124, but alternative embodiments can couple the A-CPU 120 to memory or memory devices that are separate off-chip components. The A-CPU memory 124 includes Read-Only Memory (ROM), Flash ROM, Random Access Memory (RAM), and other memory types known in the art. One skilled in the art recognizes that the A-CPU memory 124 can be any of a number of commercially available memory types assembled in any of a number of configurations.

The A-CPU 120 couples to one or more additional processors 140-X of the mobile device 501, referred to herein as communication CPUs (C-CPU) 140-X or communication processors, via at least one internal bus 130. Various alternative embodiments may use any number/combination of buses to couple the A-CPU 120 to the C-CPUs 140-X. The C-CPUs 140-X support communication signal processing appropriate to the communication protocols in use by the network 104. Communication protocols used by the network include, for example, Global System for Mobile communication (GSM), General Packet Radio Service (GPRS), Code Division Multiple Access (CDMA), and Time Division Multiple Access (TDMA), but are not so limited.

Each of the C-CPUs 140-X function as described above with reference to FIGS. 1-4. The C-CPUs 140-X of an embodiment include on-chip memory 144-X, referred to herein as C-CPU memory 144-X, but alternative embodiments can couple the C-CPU 140-X to memory or memory devices that are separate off-chip components. The C-CPU memory 144-X includes ROM, Flash ROM, and RAM, for example, as well as other memory types known in the art. One skilled in the art recognizes that the C-CPU memory 144-X, like the A-CPU memory 124, can be any of a number of commercially available memory types assembled in any of a number of configurations. In addition to the A-CPU and C-CPU, components of the mobile devices 501 can also include any number of components (not shown) known in the art, for example, buses, controllers, memory devices, data input/output (I/O) devices, displays, user interfaces, Subscriber Identity Module (SIM)/User Identity Module (UIM) cards, transmitter and receiver circuits, and antennas, in any number of combinations.

Aspects of the system for maintaining electronic files described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system for maintaining electronic files include: microcontrollers with memory (such as electronically erasable programmable read only memory (EEPROM)), embedded microprocessors, firmware, software, etc. Furthermore, aspects of the system for maintaining electronic files may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the system for maintaining electronic files is not intended to be exhaustive or to limit the system to the precise form disclosed. While specific embodiments of, and examples for, the system for maintaining electronic files are described herein for illustrative purposes, various equivalent modifications are possible within the scope of the system, as those skilled in the relevant art will recognize. The teachings of the system for maintaining electronic files provided herein can be applied to other processing systems and communication systems, not only for the systems described above.

The elements and acts of the various embodiments described above can be combined to provide further embodiments. These and other changes can be made to the system for maintaining electronic files in light of the above detailed description.

All of the above references and United States patents and patent applications are incorporated herein by reference. Aspects of the system for maintaining electronic files can be modified, if necessary, to employ the systems, functions and concepts of the various patents and applications described above to provide yet further embodiments of the system.

In general, in the following claims, the terms used should not be construed to limit the system for maintaining electronic files to the specific embodiments disclosed in the specification and the claims, but should be construed to include all processing systems that operate under the claims to provide file maintenance. Accordingly, the system for maintaining electronic files is not limited by the disclosure, but instead the scope of the system is to be determined entirely by the claims.

While certain aspects of the system for maintaining electronic files are presented below in certain claim forms, the inventor contemplates the various aspects of the system in any number of claim forms. For example, while only one aspect of the system is recited as embodied in computer-readable medium, other aspects may likewise be embodied in computer-readable medium. Accordingly, the inventor reserves the right to add additional claims after filing the application to pursue such additional claim forms for other aspects of the system for maintaining electronic files.

What is claimed is:

1. A mobile device, comprising:
   a first processor coupled among a second processor and a communication device;
   an upgrade engine coupled to the first processor to receive a maintenance file from at least one remote server via the communication device, wherein the maintenance file includes a first difference file associated with the first processor, a second difference file associated with the second processor, and wherein the first difference file includes one or more of a rewrite difference file and an upgrade difference file and the second difference file includes one or more of a rewrite difference file and an upgrade difference file, and update software files of the first processor using the first difference file of the maintenance file;
   an emulator coupled to the upgrade engine to emulate the remote server and to transfer, within the mobile device, the second difference file of the maintenance file to the second processor of the mobile device; and
   a rewrite engine coupled to the second processor to receive the second difference file from the emulator and upgrade software files of the second processor using the second difference file.

2. The device of claim 1, wherein the communication device includes at least one of a local area connection protocol and an over-the-air communication protocol.

3. The device of claim 1, further comprising a first memory coupled to the first processor and a second memory coupled to the second processor, wherein the first memory stores the received maintenance file, and the second memory stores the second difference file.

4. The device of claim 1, wherein upgrading software files of the first and second processor includes rewriting the software files using information of one or more rewrite difference files.

5. The device of claim 1, wherein upgrading software files of the first and second processor includes upgrading software modules of the first and second processor using information of one or more upgrade difference files.

6. The device of claim 1, wherein the communication device couples to a rewrite server of the remote servers using a local area connection, wherein the communication device couples to an upgrade server of the remote servers using an over-the-air connection.

7. The device of claim 6, wherein the local area coupling includes at least one of a hard-wired connection, a Bluetooth connection, a wireless local area network (WLAN) connection, a Wireless Fidelity (WiFi) connection, and an infrared (IrDA) connection.

8. The device of claim 6, wherein the over-the-air coupling includes a coupling via at least one of a communication network, a cellular telephone network, a radio frequency (RF) network, a metropolitan area network (MAN), a wide area network (WAN), and proprietary networks.

9. A system for maintaining electronic files of mobile devices, comprising:
   a mobile device including a first processor coupled among a second processor and a communication device, wherein the mobile device further includes an emulator to emulate a remote server and to transfer a second difference file of a maintenance file to the second processor of the mobile device, wherein the first difference file is associated with the first processor and the second difference file is associated with the second processor, wherein the first difference file includes one or more of a rewrite difference file and an upgrade difference file and the second difference file includes one or more of a rewrite difference file and an upgrade difference file;
   an upgrade engine of the mobile device being coupled to the first processor to receive the maintenance file from at least one remote server via the communication device, the upgrade engine updating software files of the first processor using the first difference file of the maintenance file; and
   a rewrite engine of the mobile device being coupled to the second processor to receive the second difference file and upgrade software files of the second processor using the second difference file.

10. The system of claim 9, wherein the communication device includes at least one of a local area connection protocol and an over-the-air communication protocol.

11. The system of claim 9, wherein the communication device couples to a rewrite server of the remote servers using a local area connection, wherein the communication device couples to an upgrade server of the remote servers using an over-the-air connection.

12. The system of claim 9, wherein the at least one remote server comprises at least one rewrite server, wherein the maintenance files received from the rewrite server include rewrite difference files for use in updating software files of the first and second processor by rewriting the software files.

13. The system of claim 9, wherein the at least one remote server comprises at least one upgrade server, wherein maintenance files received from the upgrade server include upgrade difference files for use in upgrading software modules of the first and second processor.

14. A mobile device, comprising:
   means for coupling a first processor of a mobile device to at least one remote server;
   means for receiving at least one maintenance file from the at least one remote server via the coupling, wherein the maintenance file includes first and second difference files, the first difference file associated with the first processor, the second difference file associated with the second processor, and wherein the first difference file includes one or more of a rewrite difference file and an upgrade difference file and the second difference file includes one or more of a rewrite difference file and an upgrade difference file;
   means for storing the maintenance file in a first memory of the first processor of the mobile device;
   means for updating software files of the first processor using the first difference file;

emulating means for emulating the at least one remote server and for transferring the second difference file to a second memory of a second processor of the mobile device; and means for updating software files of the second processor of the mobile device using the second difference file.

15. A method for maintaining electronic files of mobile devices, comprising:

coupling a first processor of a mobile device to at least one remote server and a second processor of the mobile device;

receiving at least one maintenance file from the at least one remote server via the coupling, wherein the maintenance file includes first and second difference files, the first difference file associated with the first processor, a second difference file associated with the second processor, and wherein the first difference file includes one or more of a rewrite difference file and an upgrade difference file and the second difference file includes one or more of a rewrite difference file and an upgrade difference file;

storing the maintenance file in a first memory of the first processor;

updating software files of the first processor using the first difference file;

using an emulator of the mobile device to internally emulate the remote server to transfer the second difference file to a second memory of the second processor of the mobile device; and updating software files of the second processor of the mobile device using the second difference file.

16. The method of claim 15, wherein updating software files of the second processor further includes the first processor emulating the at least one remote server to the second processor.

17. The method of claim 15, wherein the maintenance file includes rewrite difference files for use in updating software files of the first and second processor by rewriting the software files.

18. The method of claim 17, wherein receiving the maintenance file comprises receiving the first and second rewrite difference files from at least one rewrite server via a local area connection that includes at least one of a hard-wired connection, a Bluetooth connection, a wireless local area network (WLAN) connection, a Wireless Fidelity (WiFi) connection, and an infrared connection.

19. The method of claim 15, wherein the maintenance file includes upgrade difference files for use in upgrading software modules of the first and second processor.

20. The method of claim 19, wherein receiving the maintenance file comprises receiving the first and second upgrade difference files from at least one upgrade server using an over-the-air connection via at least one of a communication network, a cellular telephone network, a radio frequency (RF) network, a metropolitan area network (MAN), a wide area network (WAN), and proprietary networks.

21. The method of claim 15, wherein the coupling comprises a local area connection that includes at least one of a hard-wired connection, a Bluetooth connection, a wireless local area network (WLAN) connection, a Wireless Fidelity (WiFi) connection, and an infrared (IrDA) connection.

22. The method of claim 15, wherein the coupling comprises an over-the-air connection that includes at least one of a communication network, a cellular telephone network, a radio frequency (RF) network, a metropolitan area network (MAN), a wide area network (WAN), and proprietary networks.

23. The method of claim 15, wherein the software files include dynamic link library files, shared object files, embedded software components (EBSCs), firmware files, executable files, data files including hex data files, system configuration files, and files including personal use data.

24. A computer readable medium including executable instructions which, when executed in a processing system, maintain electronic files of mobile devices by:

coupling a first processor of a mobile device to at least one remote server and a second processor of the mobile device;

receiving at least one maintenance file from the at least one remote server via the coupling, wherein the maintenance file includes first and second difference files, the first difference file associated with the first processor, a second difference file associated with the second processor, and wherein the first difference file includes one or more of a rewrite difference file and an upgrade difference file and the second difference file includes one or more of a rewrite difference file and an upgrade difference file;

storing the maintenance file in a first memory of the first processor;

updating software files of the first processor using the first difference file;

using an emulator of the mobile device to internally emulate the remote server to transfer the second difference file to a second memory of the second processor of the mobile device; and updating software files of the second processor of the mobile device using the second difference file.

25. A mobile communication device, comprising:

a first processor coupled to a second processor of the mobile communication device, wherein a first memory is associated with the first processor and a second memory is associated with the second processor of the mobile communication device;

an upgrade engine coupled to the first processor to receive a maintenance file from at least one remote server, wherein the maintenance file includes a first difference file associated with the first processor and a second difference file associated with the second processor, wherein the first difference file includes one or more of a rewrite difference file and an upgrade difference file and the second difference file includes one or more of a rewrite difference file and an upgrade difference file, and the upgrade engine can operate to update a software file of the first processor using the first difference file;

an emulator coupled to and controlled by the first processor of the mobile communication device and being further coupled to the upgrade engine to emulate the remote server to transfer, within the mobile communication device, the second difference file from the first memory of the first processor to the second memory of the second processor of the mobile communication device; and a rewrite engine coupled to and controlled by the second processor of the mobile communication device to use the second difference file to upgrade a software file of the second processor of the mobile communication device.

* * * * *